United States Patent
Yamada et al.

(10) Patent No.: US 6,942,725 B2
(45) Date of Patent: Sep. 13, 2005

(54) INORGANIC PAINT COMPOSITION

(75) Inventors: Ichiya Yamada, Aichi-ken (JP); Koushi Yamada, Aichi-ken (JP)

(73) Assignee: Wakou Co., Ltd., Handa (JP)

( * ) Notice: Subject to any disclaimer, the term of this patent is extended or adjusted under 35 U.S.C. 154(b) by 71 days.

(21) Appl. No.: 10/880,126

(22) Filed: Jun. 29, 2004

(65) Prior Publication Data

US 2004/0261663 A1 Dec. 30, 2004

(30) Foreign Application Priority Data

Jun. 30, 2003 (JP) ........................................ 2003-186051

(51) Int. Cl.$^7$ ......................... C04B 12/04; C04B 14/00; C04B 20/00

(52) U.S. Cl. ....................................................... 106/628

(58) Field of Search .......................................... 106/628

(56) References Cited

U.S. PATENT DOCUMENTS

| | | | | | |
|---|---|---|---|---|---|
| 4,415,364 A | * | 11/1983 | Naito et al. | .................. | 106/628 |
| 4,504,314 A | * | 3/1985 | Barker et al. | ............ | 106/38.35 |
| 4,755,226 A | * | 7/1988 | Friedemann et al. | ........ | 106/628 |

* cited by examiner

*Primary Examiner*—David Brunsman
(74) *Attorney, Agent, or Firm*—Flynn, Thiel, Boutell & Tanis, P.C.

(57) ABSTRACT

The invention provides a transparent and tenacious coating film using an inorganic paint composition prepared by adding a borate salt into an alkali metal silicate, and further mixing thereto lepidoblastic transparent silica with a thickness of 0.01 to 0.5 μm and a surface diameter of 2 to 5 μm. The alkali metal silicate is solidified with metal ions issued from the borate salt to form a coating film, which contains a glass formed by solidifying dissolved boric acid in the coating film. The coating film can be made tenacious without impairing transparency by dispersing many flakes of transparent silica as laminated layers.

3 Claims, 2 Drawing Sheets

INORGANIC PAINT COMPOSITION

BACKGROUND OF THE INVENTION

1. Field of the Invention

The invention relates to an article that exhibits its characteristics by receiving or reflecting a light, particularly an inorganic paint composition useful for protecting the surface of a solar panel of a solar generator system and a mirror capable of obtaining a transparent and tenacious coating film.

2. Description of the Related Art

Various inorganic paint compositions using an alkali metal silicate as a binder have been proposed.

However, most of the coating films obtained are fragile, and fine cracks are generated by distortion when the coated subjects are expanded and contracted due to temperature changes to impair weather resistance and pollution resistance of the coating film.

Accordingly, the inventors of the invention have invented an inorganic paint composition prepared by adding a polyvalent metal-containing hardener such as calcium silicate and zinc phosphate to an alkali metal silicate, and by further adding, as an inorganic filler, a fine powder of a natural glass having a borate component-dissolving action mainly comprising colemanite and ulexite (see Japanese Patent Application Publication Nos. 3,140,611 and 3,140,612).

A tenacious coating film could be obtained in these inventions since boric acid is dissolved by mixing with water, and dissolved boric acid and the binder are simultaneously solidified when the mixed solution is dried after coating. These inorganic paint compositions have been widely recognized as coating film-forming agents for protecting the surfaces of commonly used exterior and interior construction materials and interior materials of underground passages.

However, the inorganic paint compositions described above are naturally almost impermeable to light since they contain a natural glass fine powder. Accordingly, they are not suitable as materials exhibiting their characteristics by receiving a light, for example as a solar panel of a solar generator system, and as materials that exhibits their characteristics by reflecting a light, for example as a surface protecting film of a mirror.

On the other hand, since natural minerals such as kaolin, talc and bentonite were added as fillers for improving tenacity of the coating film in inorganic paint compositions proposed by other inventors, light permeability thereof has remained insufficient.

SUMMARY OF THE INVENTION

Accordingly, it is an object of the invention for solving the problems above to provide a tenacious coating film without impairing light permeability by forming a coating film by solidifying an alkali metal silicate with metal ions originating from a borate salt. Such inorganic paint composition is prepared by adding the borate salt to the alkali metal silicate, and by further adding thereto lepidoblastic transparent silica with a thickness of 0.01 to 0.5 $\mu$m and a surface diameter of 2 to 5 $\mu$m as an inorganic filler. Transparency of the coating film is assured by allowing the coating film formed to contain a glass formed by solidification of dissolved boric acid while many thin flakes of transparent silica are dispersed and laminated.

DESCRIPTION OF THE PREFERRED EMBODIMENTS

Figure 1:
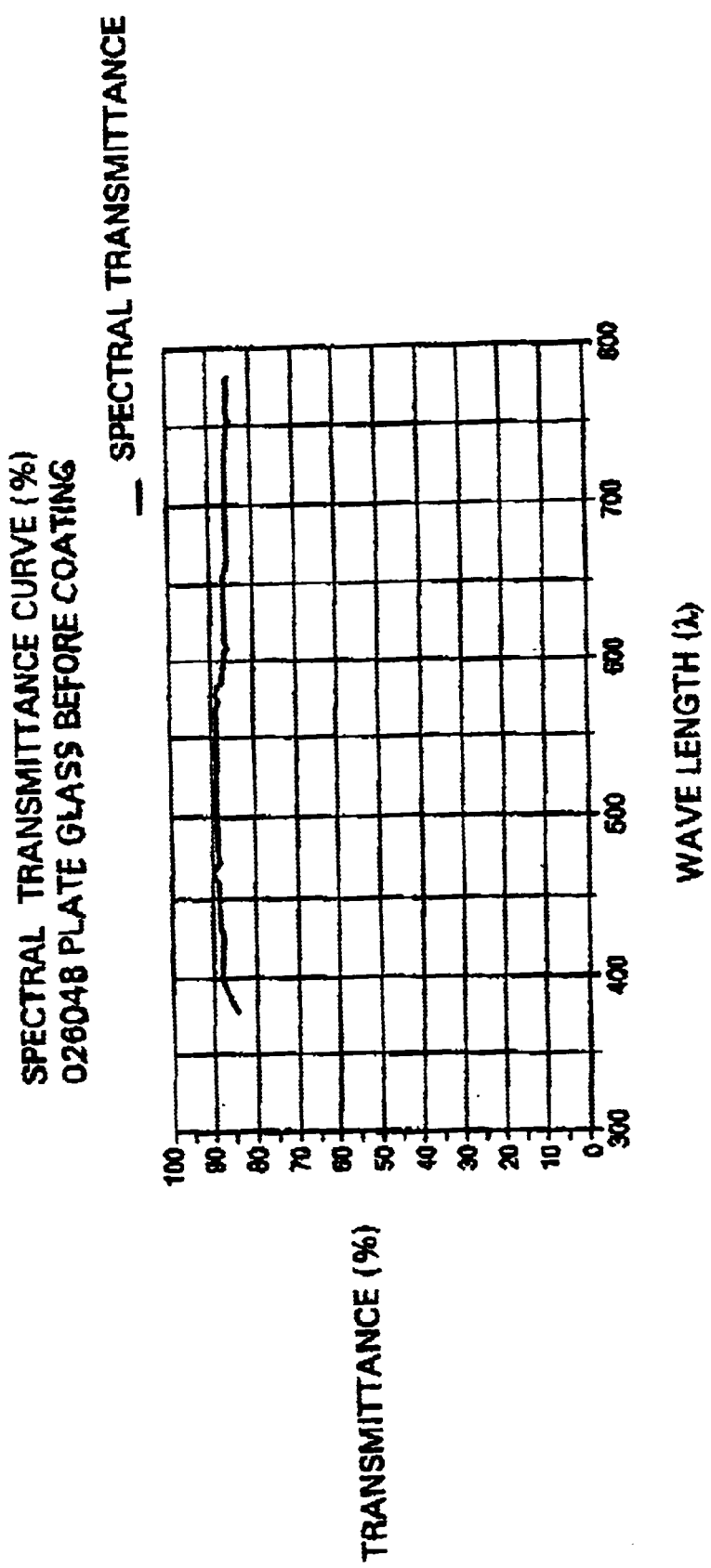
FIG. 1 is a graph showing spectral transmittance versus wavelength before coating.

The embodiments of the invention will be described hereinafter.

The inorganic paint composition of the invention is prepared by adding a borate salt into an alkali metal silicate, and further mixing thereto lepidoblastic transparent silica with a thickness of 0.01 to 0.5 $\mu$m and a surface diameter of 2 to 5 $\mu$m.

A titanium oxide fine particle may be blended with the composition above.

The alkali metal silicate is a silicate salt of an alkali metal such as lithium silicate, sodium silicate and potassium silicate, and is solidified by dehydrating contraction reaction and gelatinization by adding a borate salt as described below.

Examples of the borate salt include magnesium borate, calcium borate, barium borate, strontium borate, zinc borate and aluminum borate. These borate salts may be used alone or as a mixture.

An example of silica having the properties as described above is commercially available Sun Lovely LFS (trade name, manufactured by Asahi Glass Co., Ltd.), which is commercialized as a slurry prepared by dispersing silica as described above in water.

Solidification of the coating film is insufficient when the content of the borate salt in 100 parts by weight of the alkali metal silicate is less than 0.5 parts by weight, while solidification is so excessively rapid that fine cracks are formed in the coating film when the content exceeds 35 parts by weight. Accordingly, the proportion of the borate salt is preferably in the range of 0.5 to 35 parts by weight.

Coating power of the coating film is insufficient when the content of silica is less than 0.5 parts by weight, while transparency decreases and coating with a uniform thickness becomes impossible due to high and unstable viscosity of the paint when the content exceeds 50 parts by weight. Accordingly, the proportion of silica is preferably in the range of 0.5 to 50 parts by weight.

An appropriate proportion of the titanium fine powder is 10 to 35 parts by weight.

The function of the coating film formed by coating the inorganic paint composition of the invention will be described below.

The coating film obtained in the invention has many silanol groups (—SiOH) on the surface, and the film exhibits super-hydrophilicity by the silanol groups.

Accordingly, tough contamination such as oily contaminants adhered on the surface can be readily washed away merely by rinsing with water.

This is because strongly adsorbed water on the super-hydrophilic coating film invades the space between the coating film and contaminants, which is peeled off by being floated up from the costing film.

Super-hydrophilicity is improved in the coating film blended with the titanium oxide fine powder.

Titanium oxide contains chemically adsorbed water, and physically adsorbed water binds to the chemically adsorbed water. Physically adsorbed water is stabilized by being incorporated into gelled silica originating from the alkali metal silicate by surface diffusion. Hydrophobic organic impurities and microorganisms floating in air are decomposed by a photocatalytic reaction of titanium oxide even when they are adhered on the surface of the coating film. Accordingly, chemically adsorbed water always remains exposed.

The invention will be described in more detail with reference to examples.

Mixed in a ball mill for 10 minutes by adding water were 100 parts by weight of sodium silicate, 11 parts by weight of calcium borate and 48 parts by weight of Sun Lovely LFS (7.2 parts by weight as converted into dry silica). The mixture obtained was coated on a SUS 304 stainless steel test plate and glass test plate by spray coating, and coating films with a thickness of about 10 µm were obtained by drying for about 50 minutes in a hot air stream heated at 220 to 250° C.

The results of physical property tests of the coating film formed on the SUS 304 stainless steel plate are shown in Table 1, the results of dewetting tests are shown in Table 2, the results of chemical resistance tests are shown in Table 3, and the results of pollution resistance test are shown in Table 4.

TABLE 1

| Test Items | Test Conditions | Results |
| --- | --- | --- |
| Checkerboard Square Test | adhesive checkerboard tape method according to JIS K5400(1990) 8.5 (with an interval of 1 mm) | 100/100 |
| Specular Surface Glossiness Test | surface glossiness according to JIS K5400 (1990) 7.6 | 113% |
| Pencil Scratch Test | test method according to JIS K5400 (1990) 8.4.1 | no less than 9H |
| Impact Resistance Test | ball drop method according to JIS K5400 (1990) 8.1.3 | no problem by dropping the ball from a height of 100 cm |
| Heat Resistance Test | heat stability test of coating film according to JIS K5400 (1990) 8.1.3 | slight color change (color change by oxidation of SUS 304) |
| Surface Resistivity Test | surface resistivity according to JIS K8911 | $1 \times 10^8$ (Ω) |
| Antibacterial Test | according to JIS Z2801 (established in 2000) | *Staphylococcus aureus* < 10 *Escherichia coli* < 10 |
| Weather Resistance Test | Test Machine: weather meter manufactured by Dai-Nippon Plastic Co. Test time: 500 hours Operation Condition in One Cycle: metal halide lamp (60 mW/cm² at 360 nm) L: irradiation at 63° C., 50% RH, 6 hours R: no irradiation at 70° C., 90% RH, 2 hours D: no irradiation at 30° C., 98% RH, 4 hours water shower for 5 seconds before and after D | Initial gloss: 124.3% Gloss after 250 hours: 104.8% Gloss after 500 hours: 98.1% ΔE 2.58 |
| Brine Spray Test | 500 hours according to JIS K5400 | No rust and swelling were observed at both cross-cut and flat portions. |
| Moisture Resistance Test | 500 hours according to JIS K5400 | No damage and rust were observed at both cross-cut and flat portions. |

TABLE 2

Measurements of Contact Angle θ by Dewetting Test according to JIS K6894 (1996) 8.4

| | Contact Angle θ after 4 Hours' Boiling Water Test | Contact Angle θ of Blank Sample |
| --- | --- | --- |
| SUS 304 Plate | 9 | 14 |
| Plate Glass | 8 | 18 |
| Comparative Product (Commercially Available Product Coated with Fluorinated Paint) | 74 | |

TABLE 3

| Chemical | Judge | Chemical | Judge | Chemical | Judge |
| --- | --- | --- | --- | --- | --- |
| hydrochloric acid (10%) | A | hydrofluoric acid (46%) | D | sat. iron (II) chloride | A |
| hydrochloric acid (36%) | A | sulfuric acid (10%) | A | acetone | A |
| aqua regia | A | sulfuric acid (98%) | A | methyl acetate | A |
| perchloric acid (60%) | A | phosphoric acid (20%) | A | carbon tetrachloride | A |
| saturated chromic acid mixture | A | phosphoric acid (85%) | A | methanol | A |
| conc. sulfuric acid + conc. hydrochloric acid (1:1) | A | acetic acid (20%) | A | chloroform | A |
| conc. sulfuric acid + conc. nitric acid (1:1) | A | aq. ammonia (28%) | A | xylene | A |
| 20% nitric acid | A | sodium hydroxide (20%) | A | petroleum benzin | A |
| 60% nitric acid | A | sat. aq. sodium hydroxide | A | ethanol | A |
| 20% hydrofluoric acid | D | sat. potassium permanganate | C | | |

Judgment of results:
A - no change,
B - slightly changed,
C - evidently changed,
D - completely corroded
Test Method: Each chemical (0.2 ml) is dripped on the sample, the surface of the sample is covered with a petri dish, the sample is washed with water after allowing to stand for 24 hours at room temperature, and the surface is observed after cleaning it by wiping.

TABLE 4

| | Pollution Substance | Judge |
| --- | --- | --- |
| 1 | Sauce | A |
| 2 | Soy Sauce | A |
| 3 | Soybean Paste | A |
| 4 | Roast Meat Sauce | A |
| 5 | Mayonnaise | A |
| 6 | Fry Oil | A |
| 7 | Salad Oil | A |
| 8 | Table Salt | A |
| 9 | Nicotine | A |
| 10 | Smoke | A |
| 11 | Woolong Tea | A |
| 12 | Vinegar | A |
| 13 | Detergent "Smile" | A |
| 14 | Soap | A |
| 15 | Coffee | A |
| 16 | Japanese Tea | A |
| 17 | Blue Ink | A |
| 18 | Red Ink | A |
| 19 | Oily Marker Ink | A |

TABLE 4-continued

| | Pollution Substance | Judge |
|---|---|---|
| 20 | Domestic Sewage | A |
| 21 | Iron Rust | A |
| 22 | Oily Marker Ink (Red) | A |

Judgment of results:
A - no change,
B - slightly changed,
C - evidently changed,
D - completely corroded
Test Method: Each pollution substance (0.2 ml) is dripped on the sample, the surface of the sample is covered with a petri dish, the sample is washed with water after allowing to stand for 24 hours at room temperature, and the surface is observed after cleaning it by wiping.
Tested at Aichi Industrial Technology Center Transparency of the coating film was evaluated by measuring the changes of spectral transmittance before and after forming the coating film according to the method prescribed in JIS Z8722 (2000: color measuring method—reflection color and transmission color).

Figure 2:
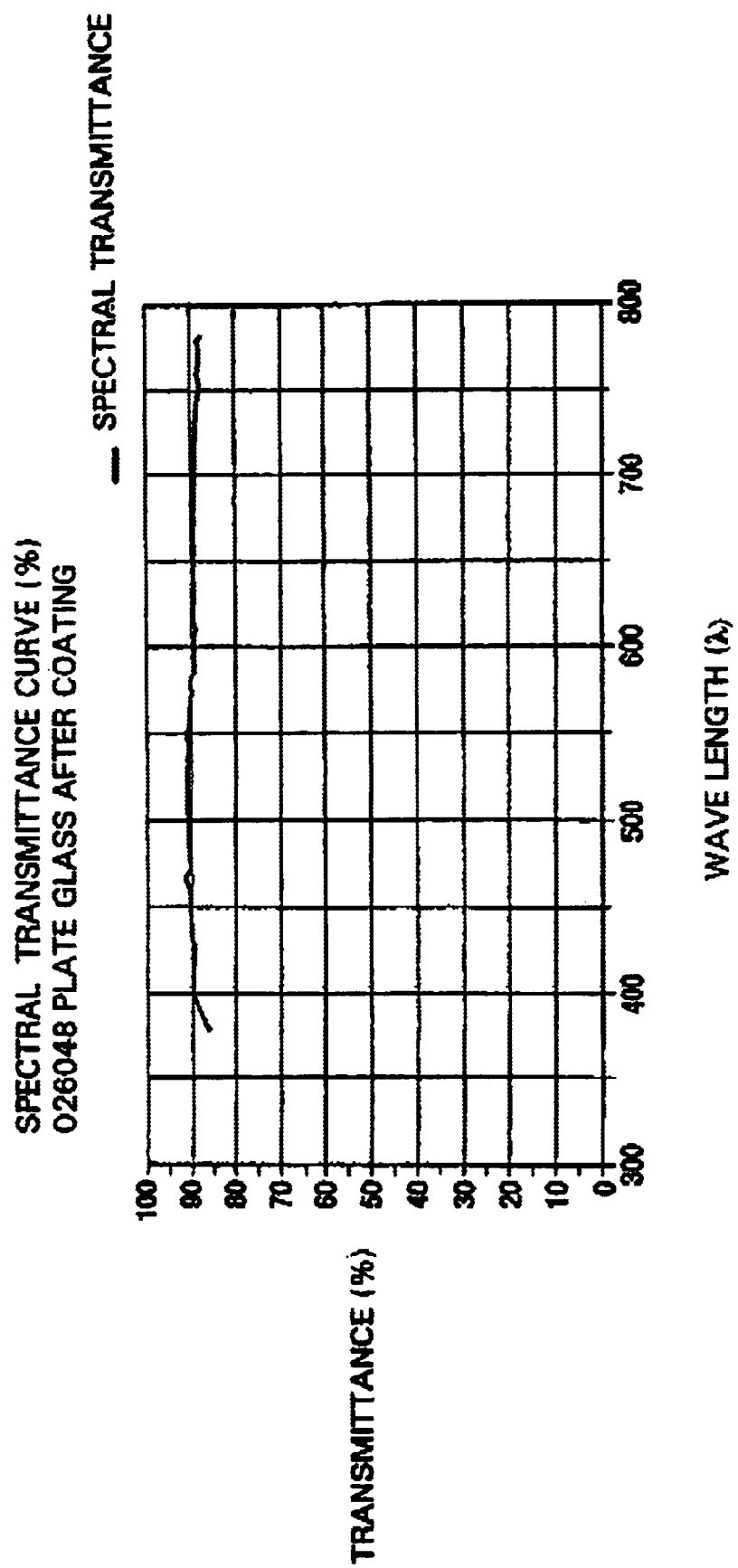
FIG. 2 is a graph illustrating spectral transmittance versus wavelength after coating.

The results of measurements of spectral transmittance of the articles before and after coating are shown in Tables 5 and 6, respectively. The graph of FIG. 1 illustrates the spectral transmittance at various wavelengths before coating as set forth in Table 5. The graph of FIG. 2 illustrates the spectral transmittance at various wavelengths after coating as set forth in Table 6.

TABLE 5

Spectral transmittance (%)
026048 plate glass before coating

| Wavelength $\lambda$ | Spectral transmittance (%) |
|---|---|
| 380 | 85.83 |
| 385 | 86.70 |
| 390 | 87.68 |
| 395 | 88.44 |
| 400 | 88.30 |
| 405 | 88.32 |
| 410 | 88.51 |
| 415 | 88.93 |
| 420 | 88.36 |
| 425 | 88.97 |
| 430 | 88.27 |
| 435 | 88.56 |
| 440 | 88.69 |
| 445 | 88.66 |
| 450 | 88.58 |
| 455 | 89.15 |
| 460 | 89.04 |
| 465 | 89.48 |
| 470 | 88.84 |
| 475 | 89.79 |
| 480 | 89.16 |
| 485 | 89.61 |
| 490 | 89.20 |
| 495 | 89.77 |
| 500 | 89.38 |
| 505 | 89.79 |
| 510 | 89.58 |
| 515 | 89.84 |
| 520 | 89.75 |
| 525 | 90.13 |
| 530 | 89.80 |
| 535 | 89.69 |
| 540 | 89.43 |
| 545 | 89.82 |
| 550 | 89.62 |
| 555 | 89.87 |
| 560 | 89.59 |
| 565 | 89.58 |
| 570 | 89.37 |
| 575 | 89.49 |
| 580 | 89.15 |
| 585 | 89.43 |
| 590 | 89.37 |
| 595 | 89.59 |
| 600 | 88.96 |
| 605 | 89.22 |
| 610 | 89.35 |
| 615 | 88.57 |
| 620 | 88.97 |
| 625 | 88.93 |
| 630 | 88.61 |
| 635 | 88.74 |
| 640 | 88.57 |
| 645 | 88.19 |
| 650 | 88.41 |
| 655 | 87.82 |
| 660 | 88.15 |
| 665 | 87.91 |
| 670 | 88.04 |
| 675 | 87.81 |
| 680 | 87.49 |
| 685 | 87.91 |
| 690 | 87.43 |
| 695 | 87.11 |
| 700 | 87.26 |
| 705 | 87.14 |
| 710 | 87.03 |
| 715 | 86.79 |
| 720 | 86.72 |
| 725 | 86.82 |
| 730 | 86.81 |
| 735 | 86.47 |
| 740 | 86.45 |
| 745 | 86.33 |
| 750 | 86.29 |
| 755 | 86.11 |
| 760 | 85.97 |
| 765 | 86.47 |
| 770 | 85.60 |
| 775 | 86.54 |
| 780 | 85.50 |
| Total | 71.5561 |
| Average | 88.34 |

TABLE 6

Spectral transmittance (%)
026048 plate glass after coating

| Wavelength $\lambda$ | Spectral transmittance (%) |
|---|---|
| 380 | 86.60 |
| 385 | 87.52 |
| 390 | 88.55 |
| 395 | 89.32 |
| 400 | 89.36 |
| 405 | 89.37 |
| 410 | 89.46 |
| 415 | 89.69 |
| 420 | 89.53 |
| 425 | 89.74 |
| 430 | 89.28 |
| 435 | 89.63 |
| 440 | 89.71 |
| 445 | 89.52 |
| 450 | 89.82 |

TABLE 6-continued

Spectral transmittance (%)
026048 plate glass after coating

| Wavelength λ | Spectral transmittance (%) |
|---|---|
| 455 | 89.97 |
| 460 | 90.29 |
| 465 | 90.39 |
| 470 | 89.97 |
| 475 | 91.07 |
| 480 | 89.96 |
| 485 | 90.60 |
| 490 | 90.48 |
| 495 | 90.93 |
| 500 | 90.78 |
| 505 | 90.86 |
| 510 | 90.70 |
| 515 | 90.90 |
| 520 | 90.84 |
| 525 | 90.92 |
| 530 | 90.95 |
| 535 | 90.62 |
| 540 | 90.59 |
| 545 | 91.06 |
| 550 | 90.56 |
| 555 | 90.91 |
| 560 | 90.57 |
| 565 | 90.79 |
| 570 | 90.76 |
| 575 | 90.61 |
| 580 | 90.40 |
| 585 | 90.12 |
| 590 | 90.46 |
| 595 | 90.53 |
| 600 | 90.03 |
| 605 | 90.09 |
| 610 | 90.18 |
| 615 | 90.08 |
| 620 | 89.82 |
| 625 | 89.86 |
| 630 | 89.59 |
| 635 | 89.70 |
| 640 | 89.67 |
| 645 | 88.95 |
| 650 | 89.19 |
| 655 | 88.99 |
| 660 | 89.04 |
| 665 | 89.04 |
| 670 | 88.55 |
| 675 | 88.96 |
| 680 | 88.85 |
| 685 | 88.75 |
| 690 | 88.56 |
| 695 | 88.35 |
| 700 | 88.50 |
| 705 | 88.39 |
| 710 | 87.97 |
| 715 | 87.92 |
| 720 | 87.79 |
| 725 | 88.01 |
| 730 | 87.89 |
| 735 | 87.52 |
| 740 | 87.37 |
| 745 | 87.57 |
| 750 | 87.36 |
| 755 | 86.92 |
| 760 | 86.85 |
| 765 | 87.23 |
| 770 | 86.57 |
| 775 | 87.46 |
| 780 | 86.53 |
| Total | 72.3876 |
| Average | 89.37 |

As shown in the results above, the coating film formed by the inorganic paint composition of the invention exhibits excellent durability, weather resistance and pollution resistance, and is quite excellent in transmission of light without exhibiting any changes of spectral transmittance before and after coating the paint on the glass surface.

The inorganic paint composition of the invention is formed by adding a borate salt in an alkali metal silicate, and lepidoblastic transparent silica with a thickness of 0.01 to 0.5 μm and a surface diameter of 2 to 5 μm is further mixed as an inorganic filler. Accordingly, a solar panel of the solar generator system, which is always exposed to the sunlight, wind and rain, can be protected without impairing power generation efficiency by coating the paint on an external panel of the solar generator system, since the coating film obtained is highly transparent while being excellent in durability and pollution resistance.

Since the coating film is super-hydrophilic, the panel can be automatically cleaned with even when rain water coating film is polluted with contaminants.

Other application examples include coating of a bath room mirror, whereby the mirror does not become cloudy since adhered water is diffused due to the super-hydrophilic nature of the coating film even when vapor is condensed on the surface of the coating film.

Since the inorganic paint composition of the invention comprises 0.5 to 35 parts by weight of the borate salt, 0.5 to 50 parts by weight of silica relative to 100 parts by weight of the alkali metal icate, the coating film is able to be endowed with a good balance among the characteristics such as durability, weather resistance and pollution resistance.

Since blending titanium oxide fine powder as a photo-catalyst permits super-hydrophilicity and self-cleaning ability of the coating film to be improved in addition to antimicrobial property, the inorganic paint composition of the invention is most suitable for painting interior walls of an old-age home and hospital. The inorganic paint composition of the invention has a quite large practical effect that enables the paint to be widely employed.

What is claimed is:

1. An inorganic paint composition prepared by adding a borate salt into an alkali metal silicate, and further mixing thereto lepidoblastic transparent silica with a thickness of 0.01 to 0.5 μm and a surface diameter of 2 to 5 μm.

2. The inorganic paint composition according to claim 1 comprising 0.5 to 35 parts by weight of the borate salt and 0.5 to 50 parts by weight of silica relative to 100 parts by weight of the alkali metal silicate.

3. The inorganic paint composition according to claim 1 blended with a fine powder of titanium oxide.

* * * * *